United States Patent [19]

Harder

[11] Patent Number: 5,297,819
[45] Date of Patent: Mar. 29, 1994

[54] QUICK CONNECT/DISCONNECT PIPE COUPLING

[76] Inventor: David R. Harder, 2 Colville Rd., Wayne, N.J. 07470

[21] Appl. No.: 961,667

[22] Filed: Oct. 16, 1992

[51] Int. Cl.$^5$ ............................................. F16L 39/02
[52] U.S. Cl. ..................................... 285/93; 285/921; 285/315; 285/319
[58] Field of Search ............... 285/319, 921, 315, 316, 285/86, 93

[56] References Cited

U.S. PATENT DOCUMENTS

| | | | |
|---|---|---|---|
| 3,853,338 | 12/1974 | Wilson | 285/86 |
| 3,866,957 | 2/1975 | Norton | 285/316 |
| 3,922,011 | 11/1975 | Walters | 285/315 |
| 3,964,771 | 6/1976 | Baudouin | 285/315 |
| 4,451,069 | 5/1984 | Melone | 285/86 |
| 4,566,723 | 1/1986 | Schulze | 285/86 |
| 4,929,002 | 5/1990 | Sauer | 285/921 |
| 5,048,875 | 9/1991 | Usui et al. | 285/921 |

FOREIGN PATENT DOCUMENTS 2060106  4/1981  United Kingdom ................ 285/315

*Primary Examiner*—Eric K. Nicholson
*Attorney, Agent, or Firm*—S. Michael Bender

[57] ABSTRACT

A quick connect/disconnect pipe coupling comprising a female receptacle member, a locking collar adapted to be slidably engaged over one end of the female receptacle member, and a male plug member adapted to be inserted into the collar engaged female receptacle member to form a tight connection therebetween. The collar includes radial locking flanges for engaging cooperating annular ridges on the plug and receptacle members, respectively. Slidable movement of the collar toward the receptacle member disengages the locking flange on the collar from the annular ridge on the male plug member thereby enabling a quick disconnect of the female receptacle member and collar from the male plug member.

5 Claims, 4 Drawing Sheets

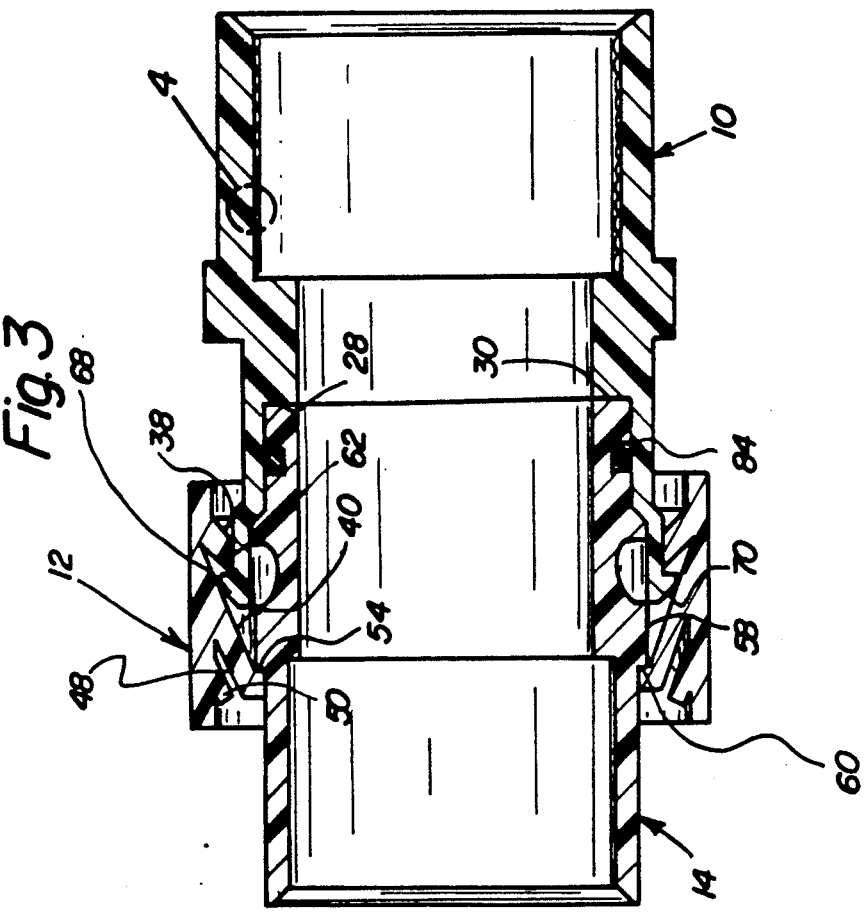

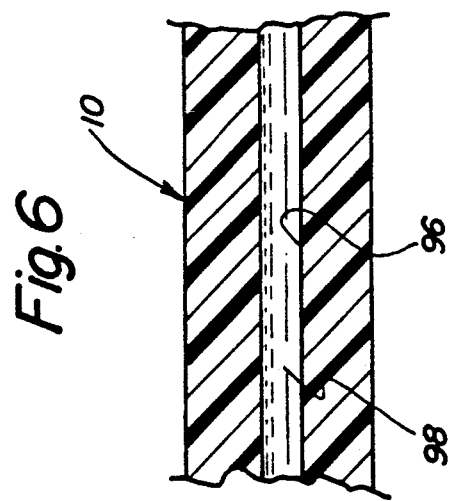
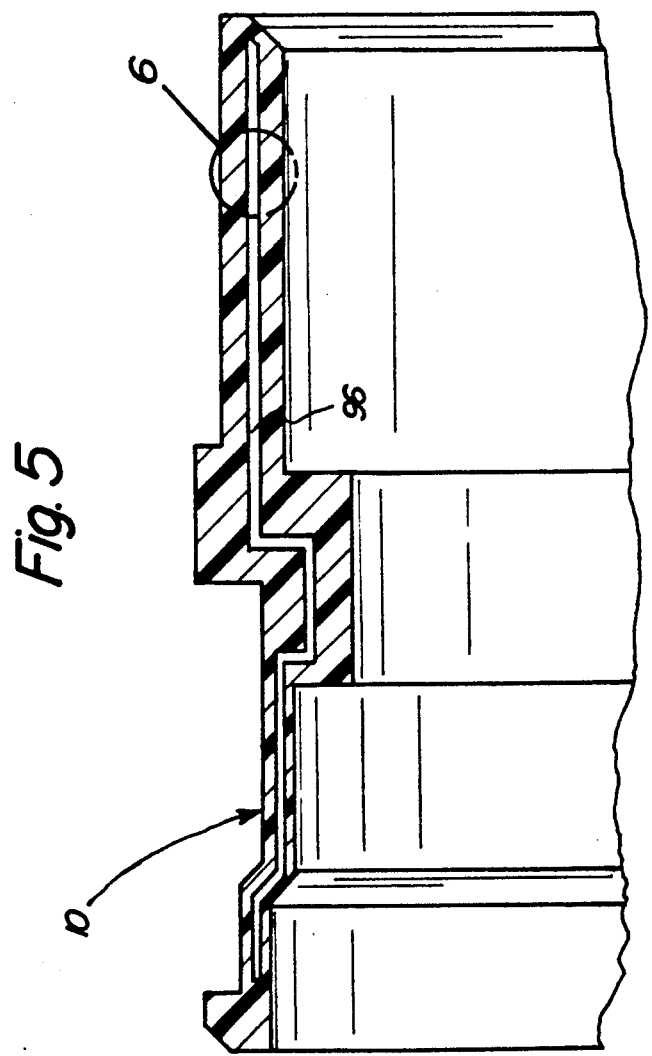

QUICK CONNECT/DISCONNECT PIPE COUPLING

BACKGROUND OF THE INVENTION

1. Field of the Invention

The present invention relates generally to pipe couplings, and more particularly, to a quick connect/disconnect pipe coupling especially adapted to form a fluid tight connection between sections of PVC pipe.

2. Description of the Prior Art

Quick connect/disconnect fluid couplings for pipe sections are generally well known. Illustrative of this are the pipe couplings disclosed in U.S. Pat. Nos. 4,982,761; 5,028,080; and 5,005,876. Each of these prior art couplings comprises a relatively complicated locking device or assembly resulting in higher than necessary manufacturing cost and difficulty of use. There exists a continuing need for a simpler, more economical quick connect/disconnect coupling which is particularly adapted to connect sections of widely used molded or extruded plastic pipe such as that commonly employed to convey water to and through swimming pools and swimming pool water treatment/filtration systems. The cost of such pipe is relatively modest and therefore the cost of pipe couplings used therewith must accordingly be low in cost. Conventional swimming pool PVC pipe couplings generally comprise male or female threaded fittings, and while such couplings are relatively low in cost, they are not capable of being quickly connected and/or disconnected. Moreover, they are difficult to use without employing a wrench or other tool.

The foregoing disadvantages are overcome by the unique quick connect/disconnect pipe coupling of the present invention as will be made apparent from the following description thereof Other advantages of the present invention over the prior art also will be rendered evident.

SUMMARY OF THE INVENTION

To achieve the foregoing and other advantages, the present invention, briefly described, provides a quick connect/disconnect pipe coupling comprising a female receptacle member, a locking collar adapted to be slidably engaged over one end of the female receptacle member, and a male plug member adapted to be inserted into the collar engaged female receptacle member to form a tight connection therebetween. The collar includes radial locking flanges for engaging cooperating annular ridges on the plug and receptacle members, respectively. Slidable movement of the collar toward the receptacle member disengages the locking flange on the collar from the annular ridge on the male plug member thereby enabling a quick disconnect of the female receptacle member and collar from the male plug member.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining the best models) of practicing the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved quick connect/disconnect pipe coupling which has all of the advantages of the prior art and none of the disadvantages.

It is another object of the present invention to provide a new an improved quick connect/disconnect pipe coupling which may be easily and efficiently manufactured and marketed.

It is a further objective of the present invention to provide a new and improved quick connect/disconnect pipe coupling which is of durable and reliable construction.

An even further object of the present invention is to provide a new and improved quick connect/disconnect pipe coupling which is susceptible of a low cost of manufacture with regard to both materials and labor, and which accordingly is then susceptible of low prices of sale to the consuming public, thereby making such quick connect/disconnect pipe coupling available to the buying public.

Still yet a further object of the present invention is to provide a new and improved quick connect/disconnect pipe coupling comprising a female receptacle member adapted to be connected to a first section of pipe and a male plug member adapted to be connected to a second section of pipe and a locking collar slidably affixed to the female receptacle member for releasable locking engagement with said male plug member.

It is still a farther object of the present invention is to provide a new and improved quick connect/disconnect pipe coupling especially adapted to join sections of PVC pipe together without requiring auxiliary tools.

Still a further object of the present invention is to provide a new and improved quick connect/disconnect pipe coupling comprising first and second mating members and no other moving parts save a locking collar slidably affixed to the second part and adapted for quick releasable locking engagement with said first part.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof such description makes reference to the annexed drawings wherein:

FIG. 3 is a cross-sectional view of the quick connect/disconnect pipe coupling of FIG. 2 showing the constituent parts thereof in assembled relation.

FIG. 4 is an enlarged detail elevational view of a portion of the embodiment of the invention shown in FIG. 3.

FIG. 5 is a partial cross-sectional view in elevation of a second preferred embodiment of the invention.

FIG. 6 is an enlarged detailed elevational view of a portion of the alternative embodiment of the invention shown in FIG. 5.

DESCRIPTION OF THE PREFERRED EMBODIMENT

With reference now to the drawings, a new and improved quick connect/disconnect pipe coupling embodying the principles and concepts of the present invention will be described.

Figure 1:
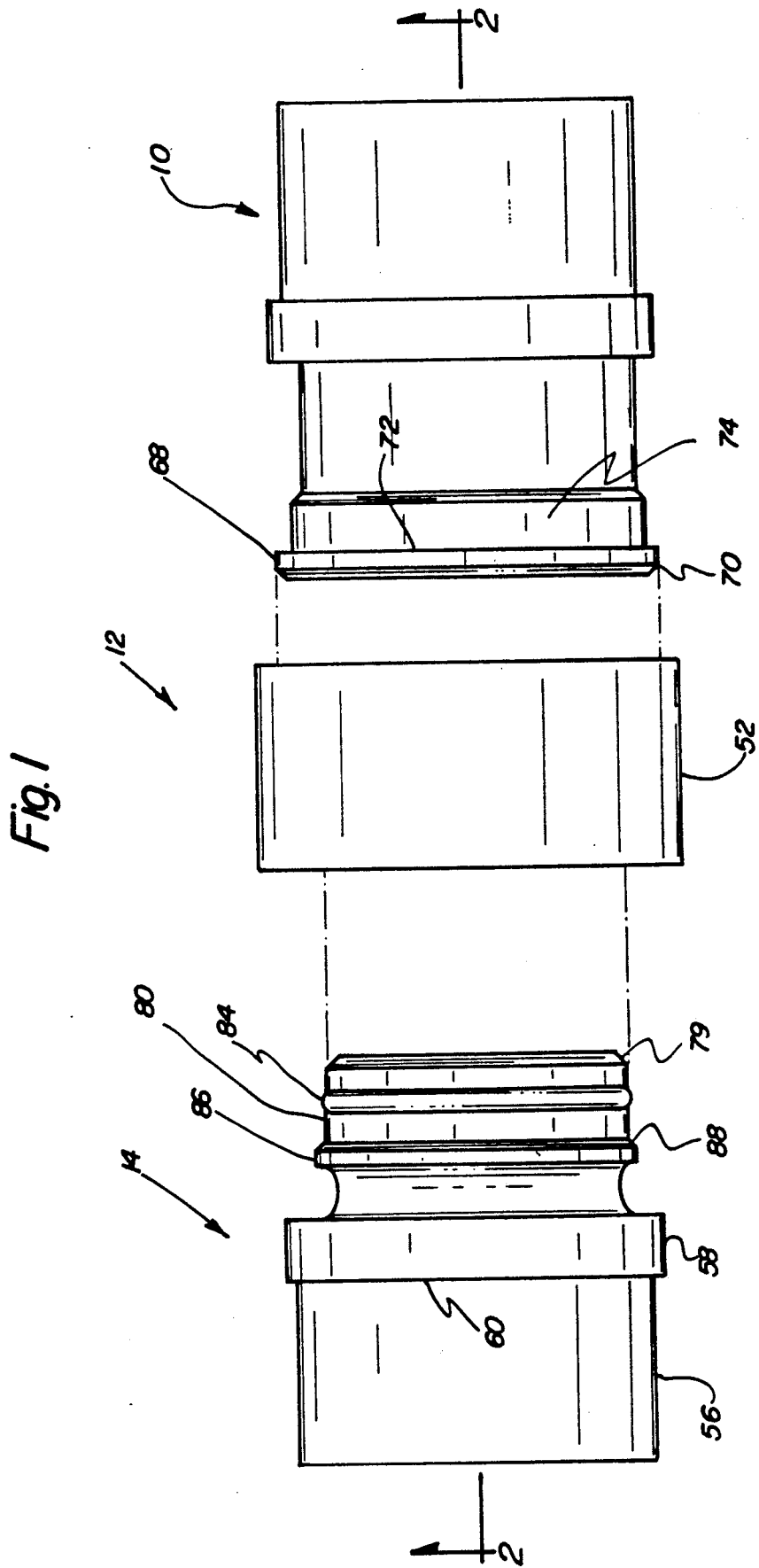
FIG. 1 is an elevational exploded assembly view showing the first preferred embodiment of the quick connect/disconnect pipe coupling of the invention.
Figure 2:
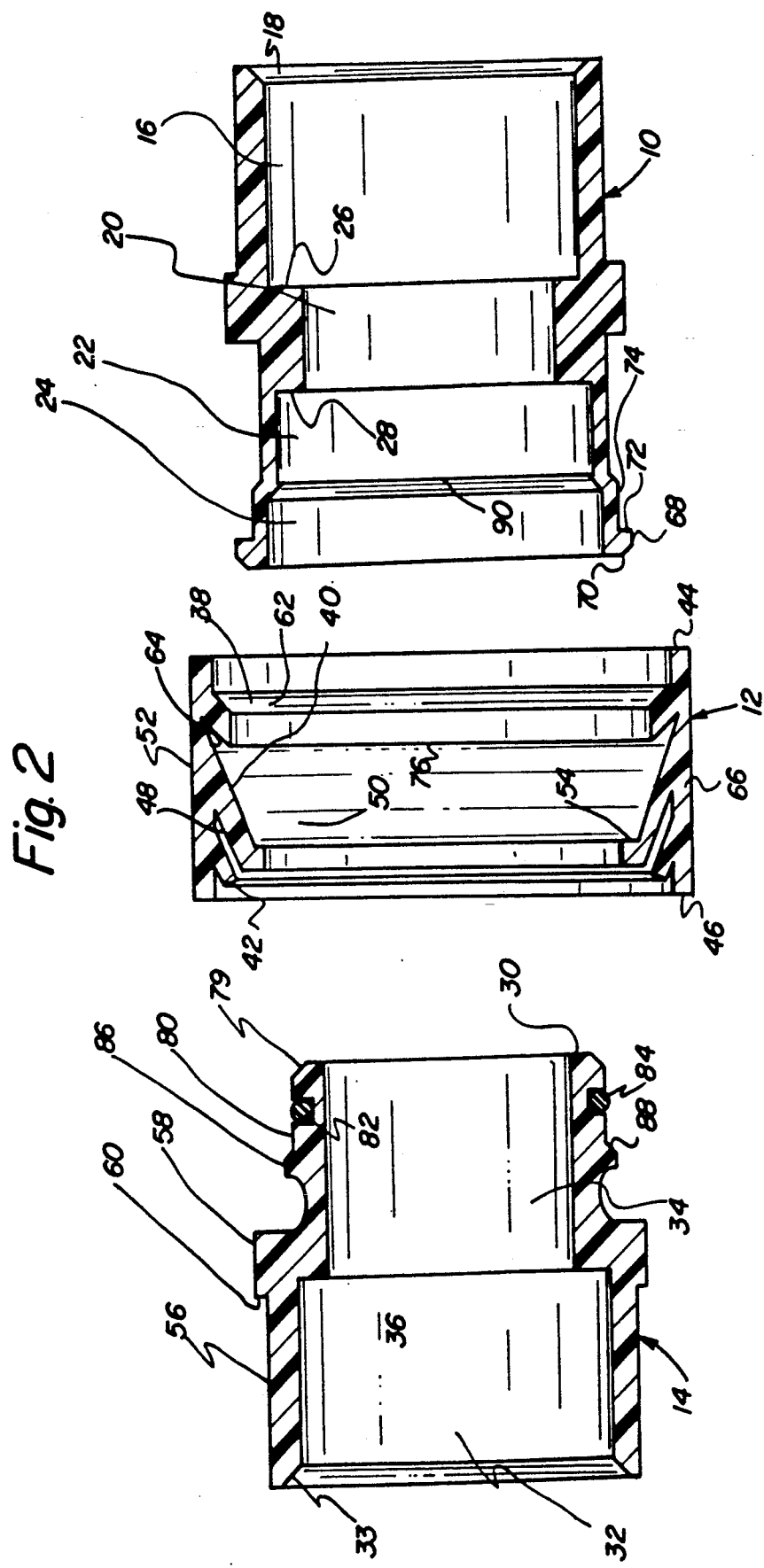
FIG. 2 is a cross-sectional elevational view of the quick connect/disconnect pipe coupling of FIG. 1 taken along line 2—2 of FIG. 1.

Turning initially to FIGS. 1 and 2, there is shown a first exemplary embodiment of the quick connect/disconnect pipe coupling of the invention comprising a first female receptacle member generally designated by reference numeral 10, a locking collar generally designated by reference numeral 12, and a male plug member generally designated by reference numeral 14. Each such part has a generally hollow cylindrical shape and share a common central axis, i.e. they are co-axially related to each other. Moreover, each part preferably is fabricated of molded or extruded polyvinyl chloride plastic (PVC) in a suitable known manner and is adapted to join together sections of tubes or pipes preferably of like known material. In this regard, receptacle 10 has a through bore of varying diametrical extent with a first bore section 16 immediately adjacent chamfered end edge 18 communicating with a second bore section 20 of reduced diameter substantially as shown (FIG. 2). The second bore section 20, in turn, opens into a third bore section 22 of substantially the same diameter as first bore section 16 whereas the third bore section 22 enters into a fourth bore section 24 of a slightly flared or enlarged diameter substantially as shown. The second bore section 20 by virtue of its reduced diameter defines a pair of opposed annular shoulders 26, 28; one of which, namely shoulder 26 serves as an abutment against which is engaged the terminal end of a first section of PVC pipe (not shown) received within first bore section 16 of receptacle 10 preferably with a tight fit and fixedly secured therein in a suitable manner as, for example, by employing a conventional liquid cement especially adapted for joining PVC pipe fittings and which compound is readily commercially available. The other opposed shoulder 28 likewise serves as an abutment surface for the chamfered end edge 30 of the male plug member 14 as will be referred to again below.

Plug member 14 also has a through bore of varying diametrical extent including a first bore section 32 adjacent opposed chamfered end edge 33 communicating with a second reduced diameter bore section 34. The diameter of first bore section 32 is substantially the same as first bore section 16 of receptacle 10. With reference to FIG. 2 and as substantially shown therein, the reduced diameter second bore section 34 of plug 14 defines an annular shoulder 36 adapted to serve as an abutment surface for the terminal end of a second section of PVC pipe (also not shown) received within first bore section 32 of plug 14 preferably with a tight fit and fixedly secured therein in the same manner indicated above with respect the first section of PVC pipe.

In accordance with the present invention, collar 12 is fixedly secured to receptacle 10 and is adapted to be releasably secured to plug member 14 as will be explained in more detail below.

As best viewed in FIGS. 2 and 3, collar 12 has three radially extending circumferential flanges 38, 40 and 42 spaced axially apart from each other between the opposed edges 44, 46 thereof flanges 40 and 42 extend substantially parallel to each other and at a first acute angle relative to the imaginary central axis (not shown) of collar 12 and are slightly spaced apart axially to define an angled circumferential slot 48 therebetween with flange 40 terminating in an angled distal edge portion defining i) an annular edge 50 parallel to the cylindrical outer surface 52 of collar 12, and ii) a radially extending annular locking shoulder or surface 54. The opening defined by annular edge 50, in turn, has substantially the same diameter as the cylindrical outer surface 56 of plug member 14 extending between edge 30 and upstanding annular cylindrical ridge 58, but may be made somewhat larger by the flexible nature of the PVC material making up flange 40 and the camming action of the cooperating receptacle 10 as will be more fully explained below. The difference in radial extent between surface 56 and ridge 58 defines an annular locking shoulder 60 substantially as depicted in FIG. 2. Flange 38 extends at a second acute angle to the central imaginary axis of collar 12 and terminates in an annular edge 62 parallel to outer surface 52 to define an opening somewhat larger in diameter than the opening defined by annular edge 50 and flange 40. It will be noted that the angle flange 38 makes with respect to the outside cylindrical surface 52 of collar 12 (i.e. the second acute angle) is greater than the angle made by flanges 40, 42 with respect to surface 52 (i.e. the first acute angle) and that the two flanges thus define a V-shaped annular groove or undercut 64 in the sidewall 66 of collar 12 axially disposed between flanges 38 and 40 substantially as shown in FIG. 2.

The extreme leftmost end of receptacle 10 as viewed in FIGS. 1 and 2 terminates in a radially extending annular flange 68 having a chamfered edge 70 thus defining an annular shoulder 72 adjacent annular cylindrical surface 74. The diameter of annular flange 68 is such as to create a slight interference fit with the diameter of the opening in collar 12 defined by angled flange 38 and annular edge 62 and therefore, collar 12 may be fitted onto and mated with receptacle 10 by moving the former to the left relative to the latter, as viewed in FIGS. 1 and 2, and urging flange 68 through the opening defined by edge 62 with the aid of chamfered edge 70 until the leftmost edge 76 of flange 38 is adjacent shoulder 72, annular edge 62 rests on surface 74, and the annular periphery of receptacle flange 68 extends into groove or undercut 64 sufficient to lockingly axially engage collar 12 relative to the receptacle 10 by virtue of the abutting engagement of edge 74 and shoulder 72. Once so positioned, collar 12 has limited slidable displacement relative to receptacle 10 longitudinally along the common central axis thereof as will be explained below. Suffice it to say at this juncture, after collar 12 is engaged with receptacle 10 as described above, the two parts are thereafter locked together although collar 12 may be slidably displaced longitudinally and axially to the right as viewed in FIGS. 1 - 3, relative to the receptacle 10 until the camming action between chamfered edge 70 and flange 40 prevents any such further longitudinal or axial movement.

The rightmost portion of plug member 14 terminates in an end edge 78 having a chamfer 79 and an adjacent annular cylindrical surface 80 in which is located an annular groove 82 of rectangular or square cross-section thereby serving as a seat for an O-ring 84 of suitable resilient material. Adjoining surface 80 substantially as shown is an upstanding radially extending annular flange 86 whose rightmost wall surface 88 has a slope substantially identical to the slope of the internal wall surface 90 serving as the transition between fourth bore portion 24 and third bore portion 22 of receptacle 10. The outside diameter of surface 80 is sized to form a slip fit with respect to the inside diameter of the third bore portion 22 of receptacle and likewise, the outside diameter of flange 86 is sized to form a slip fit with the inside diameter of fourth bore portion 24.

Hence, according to the invention, the plug member is adapted to be mated to the receptacle member by inserting the rightmost portion thereof through the opening defined by edge 50 of flange 40, and thence through the opening defined by annular edge 62 of flange 38 until the end edge 78 abuttingly engages shoulder 28 of receptacle 10 (see FIG. 3). It will be noted that when the parts are so related in their intended mating engagement, O-ring 84 provides a tight seal between surface 80 of the plug member 14 and the inside surface of the receptacle member's third bore portion 22 thus assuring tight sealing engagement therebetween.

After axial mating engagement of the plug member 14 with respect to the receptacle 10 as aforesaid, the parts may be quickly locked together by urging collar 12 to the left as viewed in FIG. 1 through 3 sufficient to cause the distal edge portion 54 of flange 40 to snap into position and peripherally engage shoulder 60 defined by the plug member's cylindrical ridge 58 in the manner shown in FIG. 3. It will be appreciated that when plug member 14, receptacle 10 and collar 12 are interengaged as shown in FIG. 3, there is produced a tightly sealed, fluid coupling between the first and second pipe sections attached to the receptacle member and the plug member, respectively.

In order to achieve a quick disconnect of the coupling assembly of the invention, all that is necessary is to urge the collar to the left as viewed in FIG. 3 as this action will cause the flange 40 to be cammed upwardly and be deflected into slot 48 sufficiently to release the distal end edge portion 54 from its peripheral locking engagement with shoulder 60 and thereby permit axial movement of the collar 12 to the right relative to the receptacle member and withdrawal of the plug member from the receptacle member in a manner now believed apparent from the above description.

The parts of the pipe coupling of the present invention may be provided with means to facilitate connection to the first and second sections of PVC pipe being coupled thereby. Thus as shown in FIG. 4, the inside surface of the first bore portions 16 and 32 of the receptacle member and the plug member, respectively, may be suitably coated with a conventional encapsulated liquid cement compound which encapsulations are rupturable upon insertion of a corresponding pipe section in each bore portion, respectively.

Similarly, the wall of receptacle member 10 may be provided with an annular interior compartment 96 for containing a colored liquid dye 98. In the event of a crack occurring in the wall of the coupling part the liquid dye will readily leak out and become clearly visible thereby indicating that the fractured component should be replaced by a new unit. The plug member may of course, be provided with similar indicating means.

It is apparent from the above that the present invention accomplishes all of the objectives set forth by providing a new and improved quick connect/disconnect pipe coupling comprising a female receptacle member adapted to be connected to a first section of pipe and a male plug member adapted to be connected to a second section of pipe and a locking collar slidably affixed to the female receptacle member for releasable locking engagement with said male plug member.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein. Hence, the proper scope of the present invention should be determined only by the broadest interpretation of the appended claims so as encompass all such modifications and equivalents.

What is claimed as being new and desired to be protected by Letters patent of the United States is as follows:

1. A quick connect/disconnect pipe coupling for connecting together first and second sections of pipe comprising:
    a female receptacle member,
    a locking collar adapted to be slidably engaged over one end of the female receptacle member, and
    a male plug member adapted to be inserted into the collar engaged female receptacle member to form a tight connection therebetween, said collar including first and second radial locking flanges for engaging cooperating annular ridges on the plug and receptacle members, respectively, wherein slidable movement of the collar toward the receptacle member is adapted to disengage the locking flange on the collar from the annular ridge on the male plug member thereby enabling a quick disconnect of the female receptacle member and collar from the male plug member, wherein said first and second radial locking flanges are axially spaced from each other to define an annular groove on the inside surface of said collar and the cooperating annular flange on said receptacle member extends into said annular groove, wherein said cooperating annular flange on said receptacle includes a chamfered edge adapted to cam against the first radial locking flange engaging said cooperating annular ridge on said plug member to disengage said first flange from said plug member annular ridge upon slidable displacement of said collar toward said receptacle member thereby to effect said quick disconnect of the female receptacle member and collar from the male plug member, and wherein said first and second sections of pipe are connected to said receptacle member and said plug through corresponding recessed bore portions in said receptacle member and said plug member, respectively.

2. The invention of claim 1 wherein said first and second sections of pipe are connected to said receptacle member and said plug through corresponding recessed bore portions in said receptacle member and said plug member, respectively.

3. The invention of claim 2 wherein at least one of said recessed bore portions has encapsulated liquid cement disposed on at least a portion of the inside surface thereof.

4. The invention of claim 1 wherein either said plug member or said receptacle member has a compartment in the wall thereof for housing a liquid dye whereby leakage of said dye is indicative of a break in said wall.

5. The invention of claim 1 wherein said plug member has an axially extending portion adapted to be inserted in a corresponding recessed bore portion of said receptacle member, said axially extending portion having an annular groove therein, and said annular groove having an O-ring therein to thereby render said tight connection therebetween effective as a water tight seal.

* * * * *